United States Patent
Minikey, Jr.

(10) Patent No.: US 9,272,665 B2
(45) Date of Patent: Mar. 1, 2016

(54) MOUNT ASSEMBLY

(71) Applicant: Gentex Corporation, Zeeland, MI (US)

(72) Inventor: Danny L. Minikey, Jr., Fenwick, MI (US)

(73) Assignee: GENTEX CORPORATION, Zeeland, MI (US)

( * ) Notice: Subject to any disclaimer, the term of this patent is extended or adjusted under 35 U.S.C. 154(b) by 0 days.

(21) Appl. No.: 14/335,348

(22) Filed: Jul. 18, 2014

(65) Prior Publication Data

US 2015/0022913 A1    Jan. 22, 2015

Related U.S. Application Data

(60) Provisional application No. 61/856,318, filed on Jul. 19, 2013.

(51) Int. Cl.
*B60R 1/04*  (2006.01)
*B60R 11/04* (2006.01)
*B60R 11/00* (2006.01)

(52) U.S. Cl.
CPC . *B60R 1/04* (2013.01); *B60R 11/04* (2013.01); *B60R 2011/0026* (2013.01)

(58) Field of Classification Search
CPC ........ B60R 1/06; B60R 1/072; B60R 7/1825; B60R 1/02; B60R 1/025; B60R 1/08
USPC .......... 359/871, 872, 844, 849, 850, 860, 875
See application file for complete search history.

(56) References Cited

U.S. PATENT DOCUMENTS 7,888,629 B2 *   2/2011   Heslin et al. .................. 250/239

* cited by examiner

*Primary Examiner* — Stephone B Allen
*Assistant Examiner* — Rahman Abdur
(74) *Attorney, Agent, or Firm* — Price Heneveld LLP; Scott P. Ryan

(57) ABSTRACT

A mount assembly for a vehicle component includes an attachment device configured to attach to a vehicle interior component. The attachment device defines an aperture and includes a vehicle attachment portion, an interior wall, and an exterior wall. A rearview device is configured to operably connect to the exterior wall of the attachment device. An accessory device is configured to operably connect to the interior wall of the attachment device.

19 Claims, 3 Drawing Sheets

MOUNT ASSEMBLY

CROSS-REFERENCE TO RELATED APPLICATION

This application claims priority to and the benefit under 35 U.S.C. §119(e) of U.S. Provisional Patent Application No. 61/856,318, filed on Jul. 19, 2013, entitled "MOUNT ASSEMBLY," the entire disclosure of which is hereby incorporated herein by reference.

FIELD OF THE DISCLOSURE

The present disclosure generally relates to a mount assembly, and more particularly, to a mount assembly for a rearview device and accessory.

SUMMARY OF THE DISCLOSURE

According to one aspect of the present disclosure, a mount assembly for a vehicle component includes an attachment device configured to attach to a vehicle interior component. The attachment device defines an aperture and includes a vehicle attachment portion, an interior wall, and an exterior wall. A rearview device is configured to operably connect to the exterior wall of the attachment device. An accessory device is configured to operably connect to the interior wall of the attachment device.

According to another aspect of the present disclosure, a rearview device for a vehicle includes a mount operably coupled with an attachment device. The attachment device is operably coupled with a vehicle interior. The attachment device defines an aperture and includes a vehicle attachment portion, an interior wall, and an exterior wall. The mount is configured to attach to the exterior wall of the attachment device. An accessory device is configured to operably connect to the interior wall of the attachment device and extend outwardly from the aperture.

According to yet another aspect of the present disclosure, a mount assembly for a vehicle component includes an attachment device configured to attach to a vehicle interior component. The attachment device defines an aperture. A rearview device is configured to operably connect to the attachment device. An accessory device includes an imager configured to operably connect to the attachment device and extend outwardly from the aperture. A second accessory device is configured to connect to at least one of the attachment device and the accessory device.

According to still another aspect of the present disclosure, a versatile mount assembly is provided that is configured for coupling with a vehicle windshield. The mount assembly includes an attachment device having an interior wall and an exterior wall. A rearview device may be operably coupled with the interior wall and an accessory device may be operably coupled with the exterior wall. Alternatively, the rearview device may be operably coupled with the exterior wall and the accessory device may be operably coupled with the interior wall. In this instance, the rearview device is operably coupled with the exterior wall via a spring member and mounting posts. The mount assembly provides a secure mounting arrangement for supporting the rearview device and one or more accessories.

These and other features, advantages, and objects of the present disclosure will be further understood and appreciated by those skilled in the art by reference to the following specification, claims, and appended drawings.

BRIEF DESCRIPTION OF THE DRAWINGS

The present disclosure will become more fully understood from the detailed description and the accompanying drawings, wherein.

DETAILED DESCRIPTION

Figure 1:
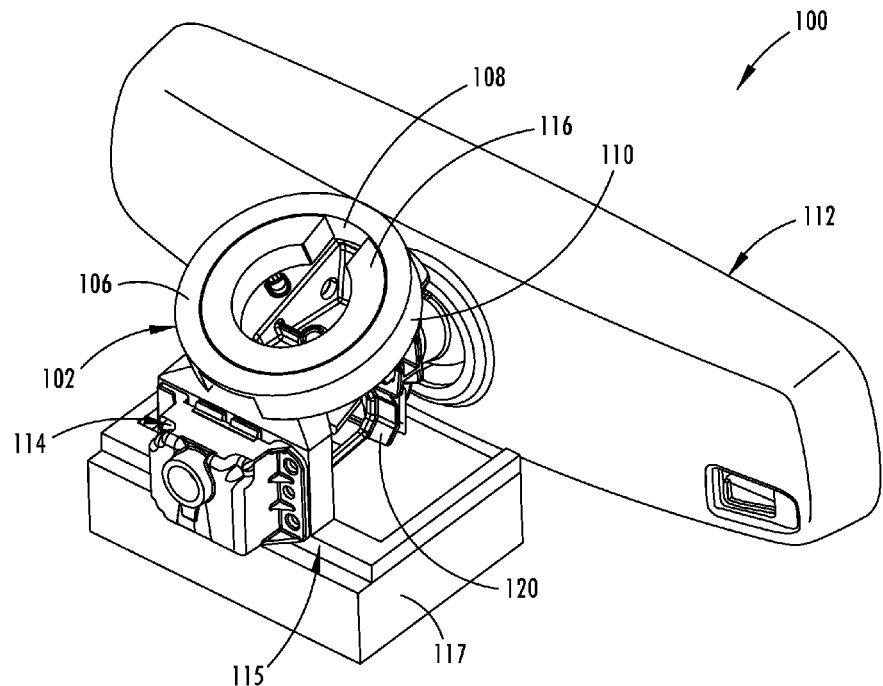
FIG. 1 is perspective view of a mount assembly having a rearview device and accessory device attached thereto, in accordance with one embodiment of the present disclosure.

The present illustrated embodiments reside primarily in combinations of method steps and apparatus components related to a mount assembly. Accordingly, the apparatus components and method steps have been represented, where appropriate, by conventional symbols in the drawings, showing only those specific details that are pertinent to understanding the embodiments of the present disclosure so as not to obscure the disclosure with details that will be readily apparent to those of ordinary skill in the art having the benefit of the description herein. Further, like numerals in the description and drawings represent like elements.

In this document, relational terms, such as first and second, top and bottom, and the like, are used solely to distinguish one entity or action from another entity or action, without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

In reference to FIGS. 1-6, a mount assembly for a vehicle component is generally shown at reference identifier 100. The mount assembly 100 includes an attachment device 102, which is configured to attach to a vehicle interior. The attachment device 102 defines an aperture 104 (e.g., fully enclosed or partially enclosed) and include a vehicle attachment portion 106, an interior wall 108, and an exterior wall 110. The mount assembly 100 includes a rearview device 112. The rearview device 112 is configured to operably connect to the attachment device 102 at the exterior wall 110 of the vehicle attachment portion 106. The mount assembly 100 includes an accessory device 114. The accessory device 114 is configured to operably couple with the attachment device 102 at the interior wall 108.

Figure 2:
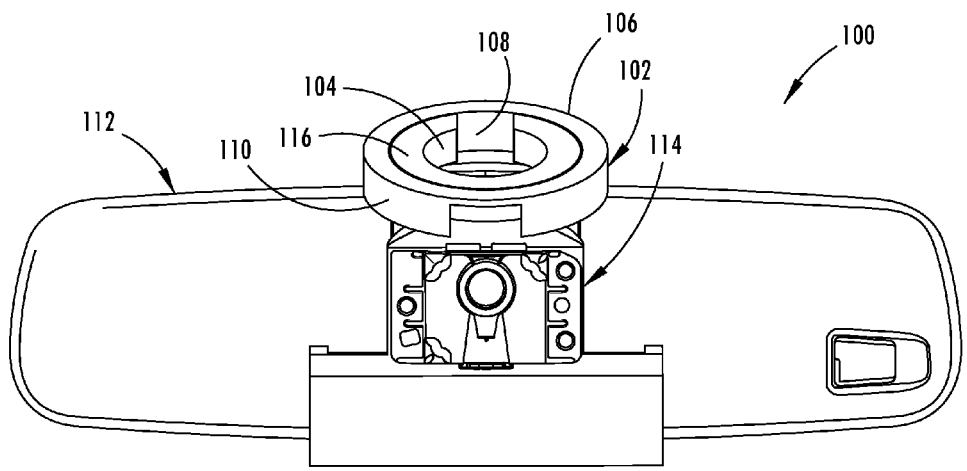
FIG. 2 is a rear view of the mount assembly of FIG. 1.
Figure 3:
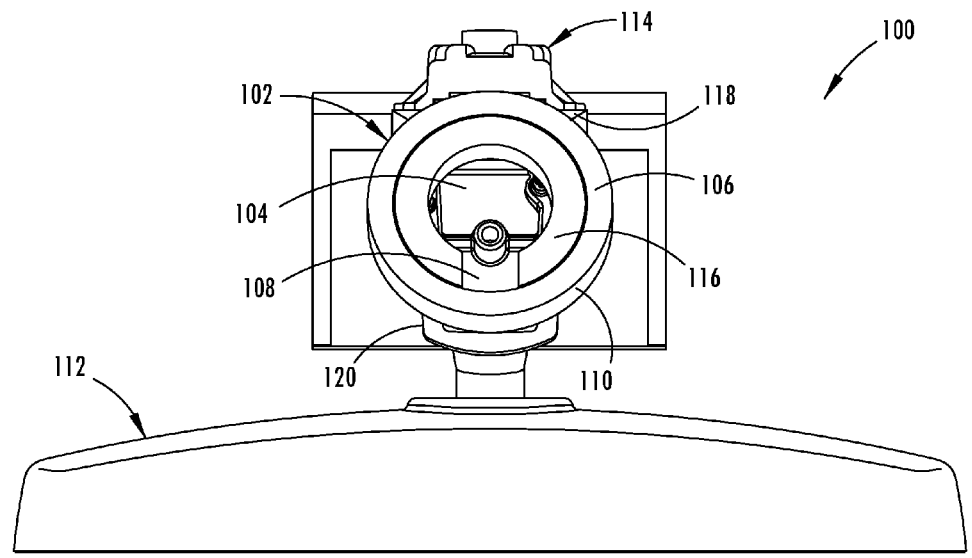
FIG. 3 is a top view of the mount assembly of FIG. 1.
Figure 4:
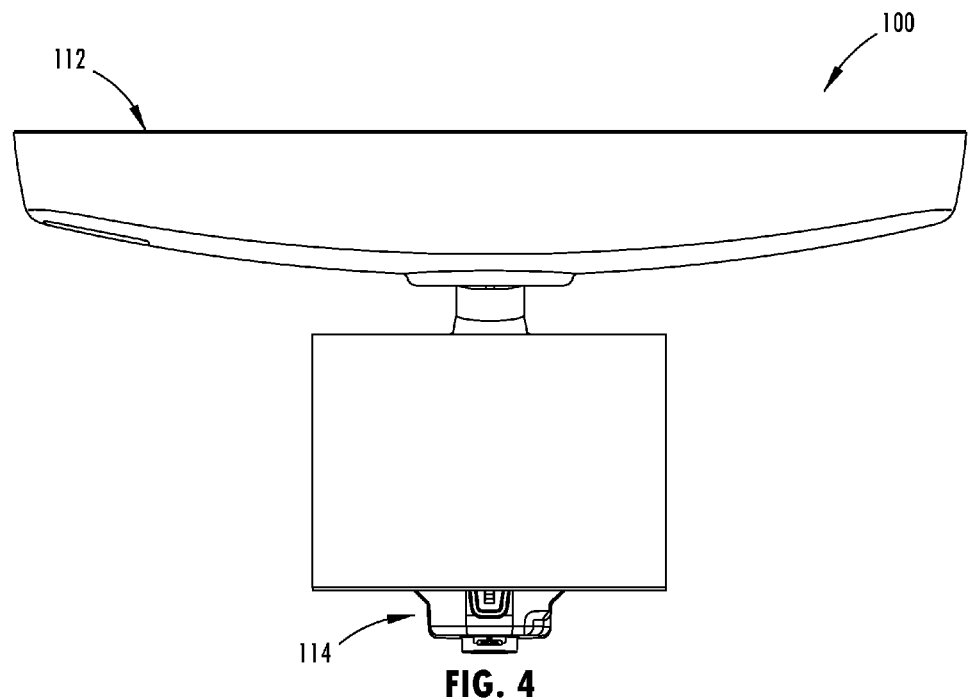
FIG. 4 is a bottom view of the mount assembly of FIG. 1.
Figure 5:
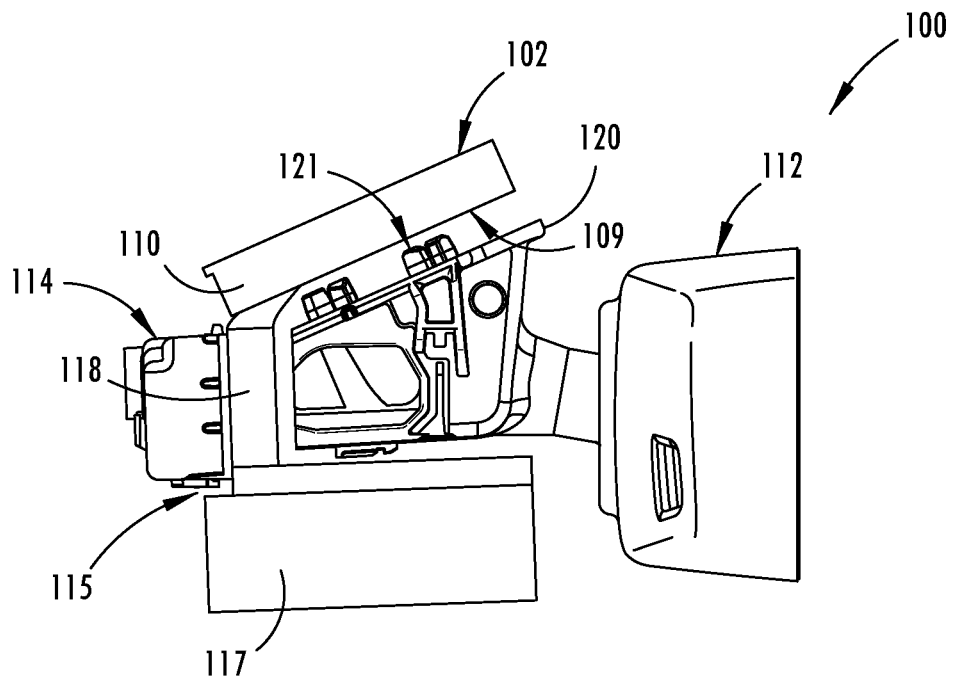
FIG. 5 is a partially exploded side view of the mount assembly of FIG. 1.
Figure 6:
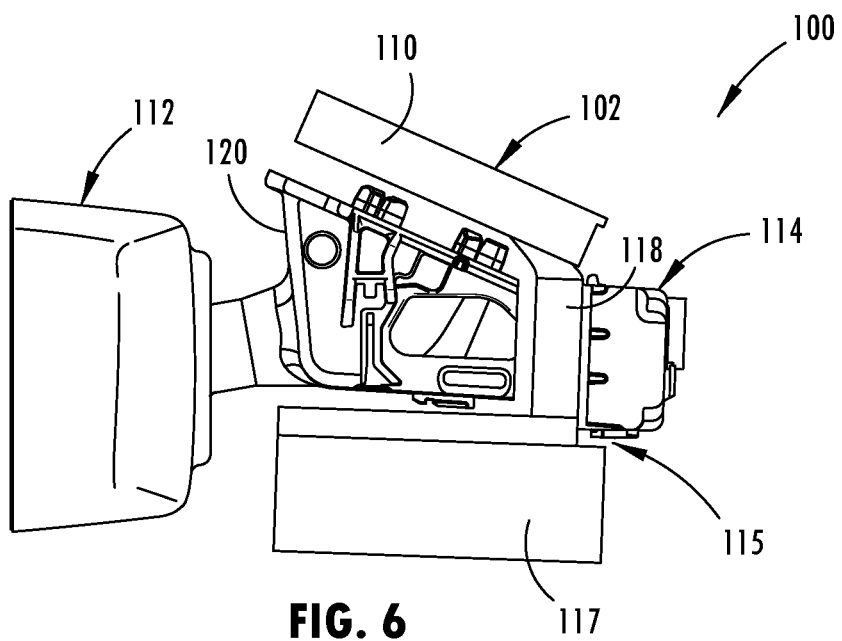
FIG. 6 is a partially exploded side view of the mount assembly of FIG. 1.

Referring now to FIGS. 1 and 2, by way of explanation and not limitation, the mount assembly 100 can be used to mount the rearview device 112 and the accessory device 114 (a forward viewing camera in FIGS. 1 and 2) so that the rearview device 112 and the accessory device 114 can be manufactured separately and use the same attachment location (e.g., attachment device 102) to attach to the vehicle interior. This attachment can be made without various components of the rearview device 112 and accessory device 114 interacting or being connected, except through their respective coupling with the attachment device 102. Additional or alternative advantages of the mount assembly 100 include the mount assembly 100 having a small overall mounting footprint. Since a plurality of systems can be mounted in close proximity to each other and utilize only one attachment feature (attachment device 102), the rearview device 112 and the accessory device 114 are isolated for enhanced vibration performance and positional tolerance such that overall performance of the components increases. Thus, the same attachment device 102 can be used without an accessory device 114 that extends outwardly from the aperture 104, if desired.

According to one embodiment, the accessory device 114 can be a light sensor, such as, but not limited to, a photo sensor, or an imager (e.g., a high resolution camera, a low resolution camera, a high dynamic range camera, etc.). In such an embodiment, the accessory device 114 can be used in a system to control one or more vehicle functions, such as, but not limited to, two-state headlamp control, variable headlamp control, lane detection, traffic sign recognition, the like, or a combination thereof.

In the illustrated embodiment of FIGS. 1 and 2, the mount assembly 100 also includes a support member 115 configured to operably connect to the interior wall 108 of attachment device 102 and the accessory device 114. The support member 115 is configured to be positioned within at least a portion of the aperture 104. The support member 115 includes a generally vertical portion 118 configured to support the first or primary accessory device 114. The first accessory device 114 can be operably coupled with the support member 115 in a variety of manners, including by an adhesive, mechanical fasteners, soldering, interference fit, etc. In addition, the support member 115 is configured to support a second or secondary accessory device 117.

Non-limiting examples of the primary accessory device 114 and the secondary accessory device 117 can be a light source (e.g., a puddle light or dash light), a light sensor, a moisture sensor, a rain sensor, a humidity sensor, an imager, imaging processing hardware, an accessory module control, an antenna, a cover, a transmitter (e.g., garage door transmitter), a receiver, a similar device, or a combination thereof. It is also contemplated that the secondary accessory device 117 may be positioned in the aperture 104 and may completely or partially fill the aperture 104. Further, the secondary accessory device 117 may be in abutting contact with the vehicle windshield or spaced a predetermined distance from the vehicle windshield. Stated differently, with reference to FIG. 1, the secondary accessory device 117 can be suspended below the attachment device 102, next to the attachment device 102, or inside the aperture 104 of the attachment device 102.

The mount assembly 100 can be configured to mount to one of a vehicle windshield and a vehicle headliner. The inner mount member 116 may be connected via an adhesive, mechanical fasteners, a spring, interference fit, etc. According to one embodiment, the rearview device 112 includes a mount 120 configured to be operably coupled with the attachment device 102. The inner mount member 116 is configured to operably couple with the attachment device 102. In such an embodiment, the attachment device 102 includes one or more attachment areas configured to receive spring members or a spring clip of the inner mount member 116. The mount 120 will likely include a spring clip attached to a top side thereof. The spring clip is generally configured for attachment with the vehicle attachment device 102. Notably, the spring clip operably coupled with the mount 120 can be constructed to engage either of the interior wall 108 and the exterior wall 110. The mount 120 can include mounting posts 121 to provide defined contact points to the attachment device 102 on a surface 109. In one embodiment, the inner mount member 116 is a supporting member that supports the vehicle attachment portion 106 as well as the support member 115 that carries the first accessory device 114. Alternatively, in another embodiment, the vehicle attachment portion 106 is a supporting member that operably couples with the vehicle windshield and supports the inner mount member 116 operably coupled with support member 115, which carries the first accessory device 114. In either instance, the support member 115 is configured to extend downwardly therefrom. It is also contemplated that power and data connections can be made to the rearview device 112 as well as all components attached to the attachment device 102.

For purposes of explanation and not limitation, in operation, the mount assembly 100 can be assembled by attaching the attachment device 102 to a windshield or headliner of a vehicle. The inner mount member 116 is configured for connection within the aperture 104 and to connect the interior wall 108 and a vertical portion 118 that extends downward from the aperture 104 and is external to the aperture 104. The inner mount member 116 can operably connect to the attachment device 102 by twisting, sliding on, a hook and latch (e.g., bullet pins, spring, etc.), screw attachment, other suitable mechanical attachments, the like, or a combination thereof. The second accessory can be operably coupled to at least one of the attachment device 102 and the support member 115 in a variety of manners, such as, but not limited to, a locator and spring mechanism. The rearview device 112 can be operably connected to the attachment device 102 by twisting on (e.g., trilobe, four-leg spring, three-leg spring, etc.), slide on (e.g., from top, from bottom, etc.), hook and latch (e.g., bullet pins, spring, etc.), two ball wedge (e.g., screw attach, spring attach), other suitable mechanical attachments, the like, or a combination thereof.

The rearview device 112 can be a rearview mirror (e.g., electro-optic, non-electro-optic, prism, etc.), a visual display, such as a liquid-crystal display (LCD) or a light-emitting diode (LED) display that relays an image from a rearview imager, or a combination thereof. It should be appreciated by those skilled in the art that the mount assembly 100 can be configured so the rearview device 112 can attach to the exterior wall 110 or the surface 109 and the accessory device 114 can be directly or indirectly operably coupled with the interior wall 108, the rearview device 112 can be directly or indirectly operably coupled with the interior wall 108 and the exterior wall 110 the accessory device 114 can be directly or indirectly operably coupled with the interior wall 108, both the rearview device 112 and the accessory device 114 can be directly or indirectly operably coupled with the exterior wall 110, or both the rearview device 112 and the accessory device 114 can be directly or indirectly operably coupled with the interior wall 108. It should further be appreciated by those skilled in the art that the components described herein can be combined, attached, or connected in combinations or ways not explicitly described.

The concept as outlined above generally defines a mounting assembly configured to allow attachment of multiple components, including a rearview device, and primary and secondary components, all to be installed on a single vehicle windshield as the vehicle windshield is moving down an assembly line. Accordingly, the need to provide additional attachment pieces for multiple components that are linked with the rearview device is unnecessary. Rather, a single attachment device 102 can be used to support all of the components that are used in conjunction with the rearview device and assembled in one or multiple steps during production. Further, the attachment device 102 can be used to apply a predetermined number of components. For example, in one instance, a manufacturer may only desire to install a rearview device and attach the same with an attachment device 102. In another instance, a manufacturer may desire to attach both a rearview device and a rain sensor in the aperture 104. This can be done along the same assembly line using a single attachment device 102 to support both the rain sensor and the rearview device. In yet another instance, a manufacturer may decide that a secondary component is also appropriate. The secondary component may be a camera that is installed and used in conjunction with the rain sensor and the rearview device. The above-noted examples are exemplary only and it will be understood by one having ordinary skill in the art that multiple variations are possible utilizing the single attachment device 102 or the mount assembly 100.

The present disclosure may be used with a mounting system such as that described in U.S. Pat. Nos. 8,201,800; 8,210,695; U.S. Patent Application Publication Nos. 2014/0063630; 2012/0327234; 2013/0062497; and 2012/0218655, and U.S. Provisional Patent Application Nos. 61/709,716; 61/707,676; and 61/704,869, which are hereby incorporated herein by reference in their entirety. Further, the present disclosure may be used with a rearview packaging assembly such as that described in U.S. Pat. Nos. 8,264,761; 8,643,931; and 8,646,924; U.S. Patent Application Publication Nos. 2013/0194650 and 2013/0062497, and U.S. Provisional Patent Application Nos. 61/707,625; and 61/590,259, which are hereby incorporated herein by reference in their entirety. Additionally, it is contemplated that the present disclosure can include a bezel such as that described in U.S. Pat. No. 8,201,800; 8,210,695; and U.S. Patent Application Publication No. 2012/0268961, which is hereby incorporated herein by reference in its entirety.

It will be understood by one having ordinary skill in the art that construction of the described disclosure and other components is not limited to any specific material. Other exemplary embodiments of the disclosure disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the disclosure as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or numeral of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present disclosure. The exemplary structures and processes disclosed herein are for illustrative purposes and are not to be construed as limiting.

It is also to be understood that variations and modifications can be made on the aforementioned structures and methods without departing from the concepts of the present disclosure, and further it is to be understood that such concepts are intended to be covered by the following claims unless these claims by their language expressly state otherwise.

What is claimed is:

1. A mount assembly for a vehicle component, the mount assembly comprising:
    an attachment device configured to attach to a vehicle interior component, the attachment device defining an aperture and comprising;
        a vehicle attachment portion;
        an interior wall; and
        an exterior wall;
    a rearview device operably coupled with the exterior wall of the attachment device;
    an accessory device operably coupled with the interior wall of the attachment device; and
    wherein the rearview device and the accessory device are independently detachable from the attachment device, such that the rearview device can be detached from the attachment device while the accessory device remains coupled with the attachment device, and the accessory device can be detached from the attachment device while the rearview device remains coupled with the attachment device.

2. The mount assembly of claim 1, wherein the accessory device is an imager.

3. The mount assembly of claim 1, further comprising:
    a second accessory device configured to operably connect to at least one of the interior wall of the attachment device and the accessory device.

4. The mount assembly of claim 1, wherein at least one of the accessory device and the secondary accessory device is at least one of a moisture sensor, a rain sensor, a humidity sensor, an imager, an antenna, a cover, a transmitter, and a receiver.

5. The mount assembly of claim 1, wherein the attachment device is configured to attach to one of a vehicle windshield and a vehicle headliner.

6. The mount assembly of claim 1, wherein the rearview device comprises at least one spring member configured to operably connect to the exterior wall of the attachment device.

7. The mount assembly of claim 1, wherein the rearview device is at least one of a rearview mirror and a visual display.

8. The mount assembly of claim 1, wherein the rearview device is an electro-optic mirror.

9. A rearview device assembly for a vehicle, the rearview device assembly comprising:
   a mount operably coupled with an attachment device, wherein the attachment device is operably coupled with a vehicle interior, the attachment device defining an aperture and comprising;
   a vehicle attachment portion;
   an interior wall; and
   an exterior wall;
   wherein the mount is configured to attach to the exterior wall of the attachment device; and
   wherein an accessory device is configured to operably connect to the interior wall of the attachment device and extend outwardly from the aperture, and wherein the accessory device and a rearview device of said rearview device assembly are independently detachable from the attachment device.

10. The rearview device assembly of claim 9, wherein the accessory device is a light sensor.

11. The rearview device assembly of claim 10, wherein the light sensor is an imager.

12. The rearview device assembly of claim 9, further comprising:
   a secondary accessory device operably coupled with at least one of the interior wall of the attachment device and the accessory device.

13. The rearview device assembly of claim 9, wherein the accessory device is at least one of a moisture sensor, a rain sensor, a humidity sensor, an imager, an antenna, a cover, a transmitter, and a receiver.

14. The rearview device assembly of claim 9, wherein the attachment device is configured to attach to one of a vehicle windshield and a vehicle headliner.

15. The rearview device assembly of claim 9, wherein the rearview device assembly comprises comprises at least one spring member configured to operably connect to the exterior wall of the attachment device.

16. The rearview device assembly of claim 9, wherein the rearview device assembly is at least one of a rearview mirror and a visual display.

17. The rearview device assembly of claim 9, wherein the rearview device assembly is an electro-optic mirror.

18. A mount assembly for a vehicle component, the mount assembly comprising:
   an attachment device configured to attach to a vehicle interior component, the attachment device defining an aperture;
   a rearview device operably coupled with the attachment device;
   an accessory device that includes an imager operably coupled with the attachment device and extending outwardly from the aperture, wherein the rearview device and the accessory device are independently detachable from the attachment device; and
   a second accessory device configured to connect to at least one of the attachment device and the accessory device.

19. The mount assembly of claim 18, wherein the attachment device is configured to attach to one of a vehicle windshield and a vehicle headliner.

* * * * *